United States Patent Office 3,517,057
Patented June 23, 1970

3,517,057
PREPARATION OF OPTICALLY ACTIVE AMINO ACIDS
Seemon H. Pines, Murray Hill, Sandor Karady, Elizabeth, and Meyer Sletzinger, North Plainfield, N.J., assignors to Merck & Co., Inc., Rahway, N.J., a corporation of New Jersey
No Drawing. Filed Sept. 21, 1967, Ser. No. 669,392
Int. Cl. C07c *101/08, 101/72*
U.S. Cl. 260—519     10 Claims

ABSTRACT OF THE DISCLOSURE

A process is described for the preparation of α-alkyl-β-phenyl serines and alianines, which comprises the condensation of an unsubstituted or substituted benzene with a 4-alkyl- (or aralkyl)oxycarbonyl-2,4-dialkyl-oxazol-5-one followed by reduction to a serine derivative or to an alanine derivative.

---

This invention is concerned with a novel process for the preparation of α-amino-α-lower alkyl-β-phenylpropionic acids, and in particular (α-lower alkyl-β-phenyl) alanines and the corresponding serines, and more particularly, the L-isomers of these compounds. The novel process can be represented by the following equations:

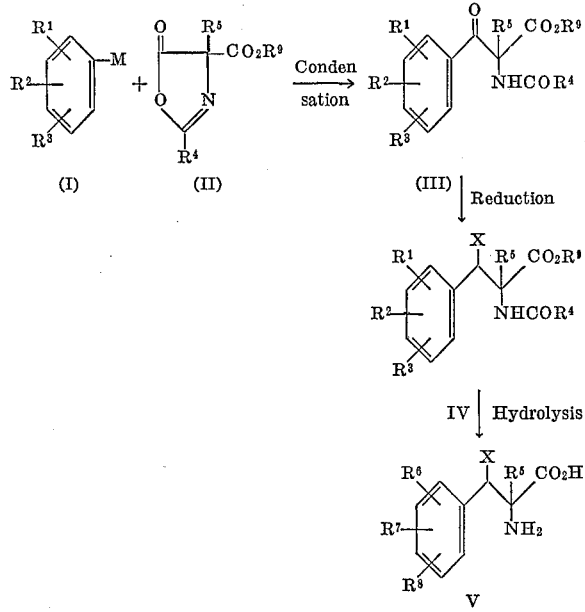

wherein M represents hydrogen, —Mg(halide, —Li or

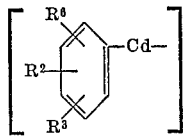

to form respectively a phenylmagnesium halide, wherein the halide is selected from chloride, bromide and iodide, a phenyllithium or a diphenylcadmium. $R^1$, $R^2$ and $R^3$ can be similar or dissimilar and each represents (a) hydrogen,
(b) lower alkyl of from 1 to about 3 carbon atoms, e.g., methyl, ethyl, propyl, and isopropyl,
(c) lower alkoxy of from 1 to about 3 carbon atoms, e.g., methoxy, ethoxy, propoxy, and isopropoxy,
(d) lower aralkoxy such as benzyloxy, and phenethyloxy,
(e) fluoro, and
(f) chloro (provided M represents other than —MgCl);

$R^4$ represents (a) lower alkyl of from 1 to about 3 carbon atoms, e.g., methyl, ethyl, and propyl, and
(b) phenyl;

$R^5$ represents lower alkyl of from 1 to about 3 carbon atoms, e.g., methyl, ethyl, propyl and isopropyl;

$R^6$, $R^7$ and $R^8$ can be similar or dissimilar and each represents (a) hydrogen
(b) lower alkyl of from 1 to about 3 carbon atoms, e.g., methyl, ethyl, propyl and isopropyl,
(c) hydroxy,
(d) fluoro, and
(e) chloro, provided M represents other than —MgCl;

$R^9$ represents (a) lower alkyl of from 1 to about 3 carbon atoms e.g., methyl, ethyl, propyl and isopropyl, and
(b) phenyl-lower alkyl e.g., benzyl, phenethyl and the like;

X represents hydrogen or hydroxyl.

The products of this novel process possess antihypertensive activity in vivo, thus being useful for the treatment of high blood pressure and hypertension in mammals, and are DOPA-decarboxylase inhibitors in vitro thus being useful in biochemical studies.

As with most biologically active compounds with an asymmetric carbon, the activity of the products prepared by the process of this invention resides in only one of the optical isomers, and as with most amino acids, in mammalian metabolism, it is the L-isomers that are active. It was therefore important to devise a process that results only in the desired isomer. In the commercial preparation of L-α-methyl DOPA (one member of the group represented by structure V) the process initially operated produced both isomers which had to be resolved. This resulted in the accumulation of large quantities of useless D-isomer. Great efforts were made to racemize this D-isomer which met with only partial success. Other processes were devised that permitted resolution of an intermediate product that lent itself to racemization of the unwanted isomer and hence total utilization.

With the novel process of the present invention it is possible to start with compound II, having the desired optical activity

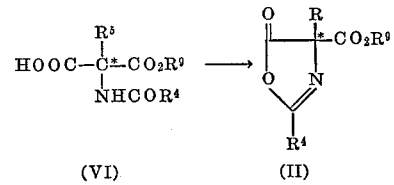

which is retained throughout the novel synthesis of this invention.

Compound II is prepared from readily available starting materials by conventional azlactone syntheses using as cyclizing agents, thionyl chloride, acetic anhydride-pyridine or a carbodiimide reagent.

From the structure of compound II it is apparent that the 4-position carbon is the asymmetric carbon, and for purposes of this invention it is desirable to have the groups attached to it in the same configuration as in L-alanine. Thus in compound VI the same configuration is required with respect to $R^5$, the ester group and the acylamino group. A problem in nomenclature then arises when naming the optically active isomers of VI which traditionally should be, for example when $R^4$ and $R^5$ is methyl and $R^9$ is ethyl, L- or D-ethyl hydrogen acetamido-methylmalonate. Such a name is quite ambiguous as it is not clear which carboxylic group has been considered with respect to the orientation of the other two groups. To obviate this ambiguity in the following description and claims, compound VI and its symmetrically esterified counterparts have been named as derivatives of L-alanine, considering the ester group of VI as the carboxylic group of alanine. Thus the example given above would be named as L- or D-α-carboxy-N-acetylalanine, ethyl ester and the corresponding diethyl ester for the sake of consistency would be α-ethoxycarbonyl-N-acetylalanine, ethyl ester.

It should be noted as an important feature of this process that the unwanted isomer of VI is readily racemized by esterification of the second carboxyl group followed by deesterification of one of the carboxyl groups, and resolution thus permitting total utilization of the starting material.

Compound I where M is Mg(halide) is prepared by a standard Grignard reaction between the substituted bromobenzene and magnesium metal. Where M represents lithium or the cadmium aryl illustrated above, these compounds are prepared by standard techniques by direct metallation of the benzenoid moiety or by lithium exchange between the corresponding aryl halide and an alkyllithium such as n-butyllithium and reaction between cadmium chloride and a Grignard reagent respectively.

The process of this invention can be considered as comprising three steps: (a) condensation, (b) reduction, and (c) hydrolysis, and each is discussed in turn.

(a) CONDENSATION

The condensation of the organometallic reagent with the azlactone is conducted by addition of a solution of compound (I) wherein M is —Mg(halide), —Li or the cadmium aryl group in ether or tetrahydrofuran to an ether or tetrahydrofuran solution of the azlactone at a temperature of from about −80° C. to about +20° C. The reaction mixture is then allowed to warm slowly to ambient temperature over about 1 to 20 hours followed, if desired, by about one hour of reflux. The reaction mixture is then quenched, for example by pouring into about one-half volume of ice-water containing a little acetic acid or other suitable media, the organic phase is separated and the product isolated by standard techniques to give compound III, a 2-benzoyl-2-acylamino-alkanoic ester.

The condensation can be achieved without the use of an organometallic reagent, through the influence of Lewis acids such as polyphosphoric acid, aluminum chloride, boron trifluoride and the like, simply by heating a mixture of the azlactone (II) the Lewis acid, and the benzenoid compound I where M is hydrogen. The directing influence of the substituents $R^1$, $R^2$ and/or $R^3$ will, of course, control the point of attachment. When the condensing agent is polyphosphoric acid, no solvent is required. The other Lewis acid condensing agents are normally employed in solvents such as carbon disulfide, nitrobenzene, or aliphatic hydrocarbons. Generally, isolation of the product from such a condensation is more complicated than from the preferred organometallic condensation, usually involving the use of preparative chromatography.

(b) REDUCTION

By selection of reaction conditions, the keto group of compound VII can be reduced either to a carbinol resulting in a serine derivative (IVa), wherein X represents OH, or directly to a methylene group providing an alanine derivative (IVb), wherein X represents H. Also, the carbinol group of the serine derivative can be reduced to the methylene group of the alanine derivative.

These processes can be summarized by the following reaction scheme:

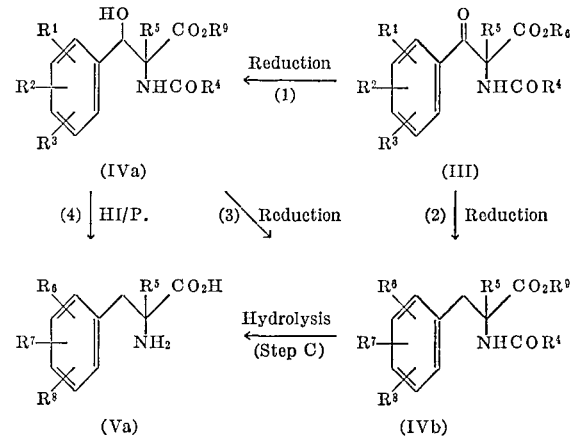

Reaction (1)

The reduction of III to IVa in the above scheme can be accomplished with any of the common borohydride reagents such as sodium, potassium or calcium borohydride, with diborane, diisoamylborane and the like, with Meerwein reagents such as diisopropoxyaluminum chloride-isopropanol or catalytically with palladium, platinum or the like in neutral medium. When using sodium or potassium borohydride it is convenient to add a large excess of an aqueous solution (5–15% concentration) of the reagent over 10 to about 30 minutes, to a solution of the keto-ester (III) in a water soluble ether such as dioxane, tetrahydrofuran or the like, and stirring for an additional time, usually about 30 minutes. The time required will vary but the reaction is conveniently followed by chromatography. When the starting material has essentially disappeared the reaction is quenched by cautious addition of a dilute mineral acid to about pH 3–5. The serine derivative is then isolated by separation of the organic phase in which it is more soluble and evaporation of the solvent. In the case of these serine derivatives it should be noted that a second asymmetric centre has been introduced, thus giving rise to threo- and erythro-isomers. These isomers can be separated by chromatography, e.g., on silica gel.

Similar results are obtained by the use of calcium borohydride in ethanol in the cold at about −30° C., or with the other above mentioned reagents in standard reactions.

Reaction (2)

The reduction of III to the alanine derivative, IVb, is conducted catalytically over platinum or palladium, preferably palladium on carbon, in acetic acid or other weak acid medium, under a hydrogen pressure of 1 to about 3 atmospheres. The product is then isolated by filtration and concentration.

Reaction (3)

The reduction of IVa to IVb is conducted in a manner identical with that described under Reaction (2).

Reaction (4)

The carbinol of structure IVa can also be reduced with simultaneous hydrolysis of the ester, amide and ether substituents with hydrogen iodide and red phosphorus to yield compound Va. The starting material, IVa, is refluxed in acetic acid or other weak acid medium with red phosphorus and hydrogen iodide solution for about 3 hours, filtered and concentrated to dryness. The product is then isolated by solution of the residue in acetone, and neutralization with a weak base such as ammonia, or with an alkylene oxide such as propylene oxide, ethylene oxide or the like which causes precipitation of the product Va.

It should be noted in the steps involving catalytic reduction that certain of the substituents represented by $R^1$, $R^2$ and $R^3$ can be affected by the reductive process. This is particularly true where these substituents are benzyloxy in which case they are simultaneously converted to hydroxy substituents. This feature is important and a decided advantage in the case of 3,4-dibenzyloxy substituents as the process results in α-methyl DOPA or its analogs.

The above is also true in Reaction (4) where the hydrogen iodide-red phosphorus conditions can result in such reductive cleavage, and also in certain acid-hydrolytic cleavages at these points as well as at the ester group and the amide group, thus obviating the necessity of a discreet hydrolysis step suggested as the third step (c) of the process of this invention.

(c) HYDROLYSIS

Except in the case of the hydriodic acid-red phosphorus reduction, the products obtained in the foregoing steps still have ester groups, amide groups and perhaps hydrolyzable phenolic ether groups. Hydrolysis of these groups can be conducted step-wise or in a single reaction as desired. The amide group is readily removed by refluxing for a short time in a lower alkanol saturated with a mineral acid such as hydrogen chloride or hydrogen bromide. The ester group then is removed by evaporating the solvent and refluxing the residue in an aqueous hydrohalic acid, preferably 4–8 N hydrochloric acid. Phenolic ether groups if present then can be removed by standard procedures, such as refluxing in constant boiling hydrobromic acid, or heating at 100–150° C. with concentrated hydrochloric acid in a sealed vessel. Such acid hydrolyses are not possible in the case of phenylserines carrying a para-phenolic group as the product suffers extensive decomposition under these conditions. If the ether groups are benzyloxy, they are most readily removed by hydrogenolysis such as with a palladium catalyst in a lower alkanol, such as methanol, ethanol, or the like, as described in part (b).

The one-step hydrolysis mentioned above is accomplished by refluxing in constant boiling hydrobromic acid, or by heating at 100–150° C. in concentrated hydrochloric acid in a sealed vessel, again with the limitation concerning p-phenolic groups on phenylserines.

EXAMPLE 1

3-(3,4-dihydroxyphenyl)-2-methylserine

Step A: Preparation of 3,4-dibenzyloxy bromobenzene.—A solution of 103 g. (0.355 mole) of o-dibenzyloxybenzene and 69.4 g. (0.39 mole) of N-bromosuccinimide is refluxed in 350 ml. of carbon tetrachloride. The reaction initiates after a few moments and boils vigorously for 5–10 minutes without heating. After the reaction subsides, the reflux period is continued one hour with the application of heat. The solution is cooled, washed with 2× 150 ml. of water, 150 ml. of 1 N sodium hydroxide solution, and again with water. The carbon tetrachloride solution is evaporated and the residue is crystallized from 200 ml. of methanol. The slurry is stirred 2 hours at 0–5° C., filtered, and washed with cold methanol. There is obtained 71.6 g. of 3,4-dibenzyloxybromobenzene (95% pure), representing a 52% yield, corrected for purity.

An analytical sample obtained by chromatography on silica gel using benzene:hexane (35:15), has M.P. 65.5–66.6° C.

Analysis.—Calculated for $C_{20}H_{17}BrO_2$ (percent): C, 65.05; H, 4.64. Found (percent): C, 65.21; H, 4.40.

Step B: Preparation of α-benzyloxycarbonyl-N-acetylalanine, benzyl ester.—α-Ethoxy carbonyl - N - acetylalanine, ethyl ester (231 g., 1 mole) is slurried in 1.2 l. of ice and water, and to it is added 2.03 equivalents of 4 N potassium hydroxide solution. After 4 hours, the solvent is removed by lyophilization. The crude salt (265.4 g.) is ground to a fine powder and stirred in 1 l. of dimethylformamide and 100 ml. of t-butanol with 392 g. (2.3 moles) of benzyl bromide at 60° C. overnight. The suspended potassium bromide is removed by filtration and washed with benzene (which is retained for extractions). The original filtrate is concentrated in high vacuum to an oil. This oil, dissolved in the above benzene, is washed with water and sodium bicarbonate, dried and again concentrated to a residue which is crystallized from a mixture of hexane:ether (500:150). The crystals are collected, washed with hexane, and dried to yield 271 g., M.P. 71–73° C. Recrystallization from ether-hexane gives α-benzyloxycarbonyl-N-acetylalanine, benzyl ester, M.P. 73.5–75° C.

Analysis.—Calculated for $C_{20}H_{21}NO_5$ (percent): C, 67.59; H, 5.96; N, 3.94. Found (percent): C, 67.75; H, 5.92; N, 3.69

Step C: Preparation of racemic α-carboxy-N-acetylalanine, benzyl ester.—A partial solution of 75 g. of α-benzyloxycarbonyl-N-acetylalanine, benzyl ester in 200 ml. of alcohol and 100 ml. of water is treated at 40–45° C. with one equivalent of potassium hydroxide solution. After the slow addition is complete the solution is warmed until neutral and treated with the calculated amount of dilute sulfuric acid. The precipitate of racemic α-carboxy-N-acetylalanine, benzyl ester (61%) is collected and recrystallized from aqueous ethanol. It has M.P. 143.5–144° C.

Analysis.—Calculated for $C_{13}H_{15}NO_5$ (percent): C, 58.86; H, 5.70; N, 5.28. Found (percent): C, 58.80; H, 5.87; N, 5.37.

Step D: Resolution of α-carboxy-N-acetylalanine, benzyl ester.—A hot ethanolic solution of 0.1 mole of racemic α-carboxy-N-acetylalanine, benzyl ester and 0.1 mole of D(+)-α-phenylethylamine is allowed to cool slowly to room temperature whereupon crystallization of the L,D salt occurs. The crystals are collected by filtration and recrystallized from ethanol. The pure salt is then dissolved in water, acidified with dilute hydrochloric acid, and extracted with chloroform. The chloroform extract is concentrated to dryness and the residue is recrystallized from aqueous ethanol to give L-α-carboxy-N-acetylalanine, benzyl ester.

Step E: Preparation of 4-benzyloxycarbonyl-2,4-dimethyloxazol-5-one.—Racemic α-carboxy - N - acetylalanine, benzyl ester (0.494 mole) is dissolved in 1400 ml. of peroxide-free, dry dioxane and 102 g. (0.494 mole) of dicyclohexylcarbodiimide in 100 ml. of the same solvent is added over 15 minutes with stirring and external cooling to 25–30° C. After 2 hours, the precipitated urea is removed by filtration, and the filtrate is concentrated in vacuo. The racemic 4-benzyloxycarbonyl-2,4-dimethyloxazol-5-one is purified by distillation, B.P. 133–135° C. (0.2 mm. Hg), 88% yield.

Analysis.—Calculated for $C_{13}H_{13}NO_4$ (percent): C, 63.15; H, 5.30; N, 5.67. Found (percent): C, 63.71; H, 5.34; N, 5.83.

Utilizing the same procedure described in Step E but starting with L-α-carboxy-N-acetylalanine, benzyl ester (from Step D), there is obtained L-4-benzyloxycarbonyl-2,4-dimethyloxazol-5-one.

Step F: Preparation of benzyl 2-acetamido-2-(3,4-dibenzyloxybenzoyl)propionate.—The Grignard reagent 3,4-dibenzyloxyphenylmagnesium bromide is prepared by refluxing 76 g. (0.206 mole) of 3,4-dibenzyloxybromobenzene (from Step A) in 200 ml. of tetrahydrofuran with 5.35 g. (0.22 g. atoms) of magnesium turnings for about 3 hours.

The Grignard reagent is added over a 2 hour period to a solution of 58 g. (0.235 mole) of racemic 4-benzyloxycarbonyl-2,4-dimethyloxazol-5-one (from Step E) in 900 ml. of anhydrous ether at −70° C. in a Dry Ice-acetone bath and then the mixture is allowed to warm to ambient temperature overnight as the coolant evaporates. The reaction is quenched by pouring it into 500 ml. of ice and water containing 30 ml. of acetic acid. The organic layer is combined with an ethyl acetate extract of the aqueous phase, washed with 500 ml. of saturated sodium bicarbonate and 100 ml. of salt solution. After drying, the solvent is evaporated and the residue is crystallized from 250 ml. of ether. There is obtained 39.5 g. (36%) of racemic benzyl 2-acetamido-2-(3,4-dibenzyloxybenzoyl)propionate, M.P. 106–108° C. Recrystallization from ethanol provides material with M.P. 110.5–111.5° C.

*Analysis.*—Calc'd for $C_{33}H_{31}NO_6$ (percent): C, 73.72; H, 5.81; N, 2.61. Found (percent): C, 73.80; H, 5.75; N, 2.66.

Utilizing the same procedure but starting with L-4-benzyloxycarbonyl-2,4-dimethyloxazol-5-one in place of the racemic compound, there is produced L-2-acetamido-2-(3,4-dibenzyloxybenzoyl)propionate.

Step G: Preparation of N-acetyl-3-(3,4-dibenzyloxyphenyl)-2-methylserine, benzyl ester.—A solution of 15.8 g. (0.03 mole) of racemic benzyl 2-acetamido-2-(3,4-dibenzyloxybenzoyl)propionate in 100 ml. of tetrahydrofuran at ice bath temperature is treated over a 5 minute period with 25 ml. of 10% aqueous sodium borohydride, while carbon dioxide is bubbling through it. After 30 minutes, the reaction is acidified with dilute hydrochloric acid and the product is extracted with ether. The washed extracts are evaporated to provide 15.7 g. of an oil which is a mixture of the erythro and threo isomers of racemic benzyl ester of N-acetyl-3-(3,4-dibenzyloxyphenyl)-2-methylserine. The erythro and threo isomers are separated by dry column chromatography on silica gel with a mixture of chloroform:acetone (15:1) as eluting agent.

The more mobile erythro isomer was crystallized from ethyl acetate-hexane, to give 12 g. M.P. 117.5–118.5° C.

*Analysis.*—Calc'd for $C_{33}H_{33}NO_6$ (percent): C, 73.45; H, 6.16; N, 2.60. Found (percent): C, 73.43; H, 6.13; N, 2.81.

The less mobile threo isomer after crystallization from the ethyl acetate-hexane gives 2 g., M.P. 109–110.5° C.

*Analysis.*—Found (percent): C, 73.47; H, 6.28; N, 2.57.

Similar results are obtained by starting with the L-isomer of benzyl 2-acetamido-2-(3,4-dibenzyloxybenzoyl)-propionate whereby there is obtained erythro- and threo-L-N-acetyl - 3 - (3,4-dibenzyloxyphenyl)-2-methylserine benzyl ester which can be separated as described above.

Step H: Preparation of erythro-3-(3,4-dihydroxyphenyl)-2-methylserine.—Racemic erythro N-acetyl-3-(3,4-dibenzyloxyphenyl)-2-methylserine, benzyl ester (10 g., 0.0186 mole) is stirred in 240 ml. of ethanol, cooled and purged with nitrogen. While maintaining an inert atmosphere, 60 ml. of 10 N ethanolic hydrogen chloride is added and the mixture is allowed to stand 2 days at ambient temperature. The solvent and excess hydrogen chloride are removed in vacuo and the residue is refluxed overnight in 200 ml. of 0.1 N ethanolic hydrogen chloride. The solvent is again evaporated and the residue is hydrogenated in 200 ml. of ethanol over 0.5 g. of 5% palladium on carbon at 2 to 3 atmospheres of hydrogen pressure. The catalyst is removed, the solvent is again evaporated, and the residue is dissolved in 60 ml. of acetone. Propylene oxide (2.5 ml.) is added under an inert atmosphere and the crude product is allowed to crystallize at ice temperature. There is obtained 4.3 g. of racemic erythro-3-(3,4-dihydroxyphenyl)-2-methylserine. Recrystallization from water gives a monohydrate, M.P. 162–163° C. (dec.).

*Analysis.*—Calc'd for $C_{10}H_{13}NO_5 \cdot H_2O$ (percent): C, 48.97; H, 6.17; N, 5.71. Found (percent): C, 49.18; H, 5.95; N, 5.75.

Using the same procedure but starting with L-erythro-N-acetyl-3-(3,4-dibenzyloxyphenyl) - 2 - methylserine, benzyl ester instead of the racemic mixture, there is obtained L-erytho - 3 - (3,4-dihydroxyphenyl) - 2 - methylserine.

Step I: Preparation of threo-3-(3,4-dihydroxyphenyl)-2-methylserine.—Employing the method of Step H on the threo isomer of racemic N-acetyl-3-(3,4-dibenzyloxyphenyl-2-methylserine, benzyl ester there is obtained racemic threo-3-(3,4-dihydroxyphenyl)-2-methylserine. M.P. 197–198° C. (dec.).

*Analysis.*—Calc'd for $C_{10}H_{13}NO_5$ (percent): C, 52.86; H, 5.77; N, 6.17. Found (percent): C, 53.05; H, 5.85; N, 6.12.

Using the same procedure but substituting for the racemic starting material, an equivalent amount of the L-threo isomer of N-acetyl-3-(3,4-dibenzyloxyphenyl)-2-methylserine, benzyl ester there is obtained L-threo-3-(3,4-dihydroxyphenyl)-2-methylserine.

EXAMPLE 2

2-methyl-3-phenylserine

Step A: Preparation of 4-ethoxycarbonyl-2,4-dimethyloxazol-5-one.—Utilizing the procedure described in Example 1, Step E, but substituting for the α-carboxy-N-acetylalanine, benzyl ester used therein, an equivalent amount of α-carboxy-N-acetylalanine, ethyl ester, there is obtained 80.5 g. (88%) of 4-ethoxycarbonyl-2,4-dimethyloxazol-5-one, B.P. 72–75° C. (0.25 mm. Hg).

*Analysis.*—Calc'd for $C_8H_{11}NO_4$ (percent): C, 51.88; H, 5.99; N, 7.56. Found (percent): C, 51.85; H, 5.85; N, 7.66.

Step B: Preparation of ethyl 2-acetamido-2-benzoylpropionate.—A solution of phenylmagnesium bromide (0.03 mole) in 20 ml. of tetrahydrofuran is refluxed for 1 hour with 0.015 mole of anhydrous cadmium chloride. The supernatant, containing diphenylcadmium is decanted and added over 2 hours to a solution of 6 g. (0.032 mole) 4-ethoxycarbonyl-2,4-dimethyloxazol-5-one in 100 ml. of ether cooled in a Dry Ice-acetone bath. The mixture is allowed to warm to room temperature and is decomposed by addition of 30 ml. of 3 N hydrochloric acid. The ether layer is washed with water, 10% sodium carbonate solution, and water. After removal of the solvent, the residue is crystallized from ether-hexane to yield 2.8 g. (28%) of ethyl 2-acetamido-2-benzoylpropionate which after recrystallization from ether has M.P. 80–81° C.

*Analysis.*—Calc'd for $C_{14}H_{17}NO_4$ (percent): C, 63.86; H, 6.51; N, 5.32. Found (percent): C, 63.76; H, 6.26; N, 5.29.

Step C: Preparation of N-acetyl-2-methyl-3-phenylserine, ethyl ester.—An ethanolic solution of calcium borohydride (6.6 mmoles in 17 ml.) is mixed at −30° C. with a solution of 17.3 g. (1.6 mmoles) of ethyl 2-acetamido-2-benzoylpropionate in 5 ml. of ethanol. After 30 minutes at −30° C., the reaction is decomposed with dilute hydrochloric acid. Most of the ethanol is removed by evaporation, and the residue is extracted with methylene chloride. The washed and dried extracts yield 1.4 g. of oil which after chromatography as described in Example 1G yields 425 mg. of erythro-N-acetyl-2-methyl-3-phenylserine, ethyl ester, M.P. 129–30° C.

*Analysis.*—Calculated for $C_{14}H_{19}NO_4$ (percent): C, 63.38; H, 7.22; N, 5.28. Found: (percent): C, 63.42; H, 7.14; N, 5.24.

Also obtained is 510 mg. of pure threo isomer, M.P. 128–129° C.

*Analysis.*—Found (percent): C, 63.27; H, 7.36; N, 5.28.

Step D: Preparation of erythro-2-methyl-3-phenylserine.—A solution of 1.25 g. of erythro-N-acetyl-2-methyl-3-phenylserine, ethyl ester in 50 ml. of methanol is cooled in ice and saturated with dry hydrogen chloride. The solution is refluxed 1 hour, evaporated and the residue taken up in 50 ml. of 6 N hydrochloric acid, and refluxed under an atmosphere of nitrogen overnight. Again the solvent is removed, and the residue taken up in 10 ml. of acetone. The free amino acid is precipitated by addition of an excess of propylene oxide. Recrystallization from water gives 600 mg. (65%) of pure erythro-2-methyl-3-phenylserine, M.P. 208–210° C.

*Analysis.*—Calculated for $C_{10}H_{13}NO_3$ (percent): C, 61.52; H, 6.71; N, 7.18. Found (percent): C, 61.53; H, 6.51; N, 7.17.

Step E: Preparation of threo-2-methyl-3-phenylserine.—Utilizing the procedure of Step D on the threo isomer there is obtained threo-2-methyl-3-phenylserine, M.P. 249° C.

*Analysis.*—Found (percent): C, 61.32; H, 6.77; N, 7.37.

EXAMPLE 3

L-2-methyl-3-phenylserine

Step A: Preparation of L-α-carboxy-N-acetylalanine, ethyl ester.—Using the procedure of Example 1, Step D, but substituting for the racemic α-carboxy-N-acetylalanine, benzyl ester, utilized therein, an equivalent amount of racemic-α-carboxy-N-acetylalanine, ethyl ester there is obtained the corresponding L isomer.

Using the procedure of Example 2, Steps A to E, but in each case starting with the corresponding L-isomer, there is produced in turn: Step B—L-4-ethoxycarbonyl-2,4-dimethyloxazol-5-one; Step C—L-ethyl 2-acetamido-2-benzoylpropionate; Step D—L-erythro-and threo- N-acetyl-2-methyl-3-phenylserine, ethyl ester; Step E—L-erythro-2-methyl-3-phenylserine; and Step F—L-threo-2-methyl-3-phenylserine.

EXAMPLE 4

L-3-(3,4-dimethoxyphenyl)-2-methylserine

Step A: Preparation of L-ethyl 2-acetamido-2-(3,4-dimethoxybenzoyl)propionate.—A solution of 3,4-dimethoxybromo benzene (0.03 mole) in 20 ml. of tetrahydrofuran is treated at −70° C. with 0.03 mole of commercial n-butyllithium in ether. The resulting solution of 3,4-dimethoxyphenyllithium is added over 2 hours to a solution of 6 g. (0.032 mole) of L-4-ethoxycarbonyl-2,4-dimethyl-oxazol-5-one in 100 ml. of ether at −70° C. The remainder of the preparation is conducted exactly as described in Example 2, Step B, to yield ethyl L-2-acetamido-2-(3,4-dimethoxybenzoyl)propionate.

Step B: Preparation of L-N-acetyl-3-(3,4-dimethoxyphenyl)-2-methylserine, ethyl ester.—Utilizing the procedure of Example 1, Step G, but substituting for the benzyl 2-acetamido-2-(3,4-dibenzyloxybenzoyl)propionate and sodium borohydride used therein, equivalent amounts of ethyl L-2-acetamido-2-(3,4-dimethoxybenzoyl)propionate and potassium borohydride, there is produced a mixture of the erythro- and threo-isomers of L-N-acetyl-3-(3,4-dimethoxyphenyl)-2-methylserine, ethyl ester.

Step C: Preparation of L-3-(3,4-dimethoxyphenyl)-2-methylserine.—A solution of 10 g. of L-N-acetyl-3-(3,4-dimethoxyphenyl)-2-methylserine in 100 ml. of 6 N hydrochloric acid is refluxed for 5 hours. After cooling, the hydrochloric acid is removed by concentration in vacuo and the residue is taken up in 60 ml. of acetone. Propylene oxide (2.5 ml.) is added and the product is allowed to crystallize at ice temperature to give a mixture of erythro- and threo-L-3-(3,4-dimethoxyphenyl)-2-methylserine.

EXAMPLE 5

L-2-methyl-3-(3,4-dihydroxyphenyl)alanine

Step A: Preparation of ethyl L-2-acetamido-2-(3,4-dibenzyloxybenzoyl)propionate.—To a mixture of 18.5 g., (0.1 mole) of L-4-ethoxycarbonyl-2,4-dimethyloxazol-5-one and 29 g. (0.1 mole) of dibenzyloxybenzene is added 100 g. of polyphosphoric acid. After homogenization the mixture is heated in an oil bath to 80° C. for 1 hour. Water and ice are added and the product is extracted with ether and the extract is washed wth sodium bicarbonate solution. The product, ethyl L-2-acetamido-2-(3,4-dibenzyloxybenzoyl)propionate is isolated by chromatography on silica gel, by elution with a mixture of chloroform: acetone (15:1).

Step B: Preparation of L-N-acetyl-2-methyl-3-(3,4-dihydroxyphenyl)alanine, ethyl ester.—A solution of 10 g. of ethyl L-2-acetamido-2-(3,4-dibenzyloxybenzoyl)propionate in 200 ml. of acetic acid is hydrogenated over 0.5 g. of 5% palladium on carbon catalyst at 3 atmospheres of hydrogen pressure. The catalyst is removed by filtration and the solvent is evaporated to give L-N-acetyl-2-methyl-3-(3,4-dihydroxyphenyl)alanine, ethyl ester.

Step C. Preparation of L-2-methyl-3-(3,4-dihydroxyphenyl)alanine.—The L-N-acetyl-2-methyl-3-(3,4 - dihydroxyphenyl)alanine, ethyl ester from Step B is taken up in 100 ml. of concentrated hydrochloric acid and refluxed for 5 hours. The excess solvent and hydrochloric acid are evaporated in vacuo and the residue is dissolved in 60 ml. of acetone. Propylene oxide (2.5 ml.) is added under an inert atmosphere and the product is allowed to crystallize at room temperature to give L-2-methyl-3-(3,4-dihydroxyphenyl)alanine.

EXAMPLE 6

L-2-methyl-3-(3,4-dihydroxyphenyl)alanine

Utilizing the procedure of Example 5, Steps B and C, but substituting for the ethyl L-2-acetamido-2-(3,4-dibenzyloxybenzoyl)propionate used in Step B, an equivalent amount of L-N-acetyl-3-(3,4-dibenzyloxyphenyl)-2-methylserine, benzyl ester (from Example 1, Step G, either erythro-, threo, or the mixture of isomers) there is produced, L-2-methyl-3-(3,4-dihydroxyphenyl)alanine.

EXAMPLE 7

L-2-methyl-3-(3,4-dihydroxyphenyl)alanine

To a solution of 7.9 g. of L-N-acetyl-3-(3,4-dibenzyloxyphenyl)-2-methylserine, benzyl ester (from Example 1, Step G) in 40 ml. of acetic acid is added 9 g. of red phosphorus and 30 ml. of 58% hydriodic acid. The mixture is refluxed for 3 hours. After cooling, the phosphorus is removed by filtration and the filtrate is concentrated in vacuo to a gummy residue which is dissolved in 100 ml. of acetone and filtered. The crude product is precipitated by addition of 2 g. of propylene oxide and cooling. Pure L-2-methyl-3-(3,4 - dihydroxyphenyl)alanine hydrochloride is obtained by ion exchange chromatography on IR 120 ion exchange resin (Rohm and Haas Company, Philadelphia, Pa.) by elution with 2.5 N hydrochloric acid. Conversion to the free base is accomplished by treating an ethanolic soltuion of the hydrochloride with ammonia.

EXAMPLE 8

2-methyl-3-phenylalanine

Utilizing the procedure of Example 5, Steps B and C, but substituting for the ethyl 2-acetamido-2-(3,4-dibenzyloxybenzoyl)propionate used in Step B, an equivalent amount of ethyl 2-acetamido-2-benzoylpropionate (from Example 2, Step B), there is produced 2-methyl-3-phenylalanine.

EXAMPLE 9

L-2-ethyl-3-(3,4-dihydroxy-5-methylphenyl)alanine

Step F: Preparation of L-α-carboxy-β-methyl-N-acetylalanine, ethyl ester.—Employing the procedure of Example 1, Step C, but substituting for the α-benzyloxycarbonyl-N-acetylalanine, benzyl ester used therein, an equivalent amount of α-ethoxycarbonyl-β-methyl-N-acetylalanine, ethyl ester there is produced α-carboxy-β-methyl-N-acetylalanine, ethyl ester.

Resolution in a manner identical with that described in Example 1, Step D, provides the L-isomer.

Step B: Preparation of L-4-ethoxycarbonyl-2-methyl-4-ethyloxazol-5-one.—Employing the procedure of Example 1, Step E, but substituting for the L-α-carboxy-N-acetylalanine, benzyl ester used therein, an equivalent amount of L-α-carboxy-β-ethyl-N-acetylalanine, ethyl ester, there is produced L-4-ethoxycarbonyl-2-methyl-4-ethyloxazol - 5-one.

Step C: Preparation of L-ethyl 2-acetamido-2-(3,4-dimethoxy - 5 - methylbenzoyl)butyrate.—Employing the method of Example 1, Step F but substituting for the 3,4-dibenzyloxybromobenzene and the 4-benzyloxycarbonyl-2,4-dimethyloxazol-5-one, used therein, equivalent amounts of 3,4-dimethoxy-5-methylbromobenzene and L-4-ethoxycarbonyl-2-methyl-4-ethyloxazol-5 - one, there is produced L-ethyl 2-acetamido-2-(3,4-dimethoxy-5-methylbenzoyl)butyrate.

Step D: Preparation of L-N-acetyl-2-ethyl-3-(3,4-dimethoxy-5-methylphenyl)alanine, ethyl ester.—Employing the method described in Example 5, step B, but substituting for the ethyl L-2-acetamido-2-(3,4-dibenzyloxybenzoyl)propionate used therein an equivalent amount of ethyl L-2-acetamido-2-(3,4-dimethoxy-5 - methylbenzoyl)butyrate, there is obtained L-N-acetyl-2-ethyl-3-(3,4-dimethoxy-5-methylphenyl)alanine, ethyl ester.

Step E: Preparation of L-2-ethyl-3-(3,4-dihydroxy-5-methylphenyl)alanine.—A solution of 10 g. of L-N-acetyl-2-ethyl-3-(3,4-dimethoxy-5 - methylphenyl)alanine, ethyl ester in 100 ml. of 48% hydrobromic acid is refluxed for 8 hours. After cooling, the hydrobromic acid is removed by concentration in vacuo and the residue is taken up in 60 ml. of acetone. Propylene oxide (2.5 ml.) is added under an inert atmosphere and the product is allowed to crystallize at ice-temperature to a mixture of erythro- and threo-L-2-ethyl-3-(3,4-dihydroxy-5-methylphenyl)alanine.

EXAMPLE 10

L-2-methyl-3-(4-fluorophenyl)alanine

Step A: Preparation of benzyl L-2-acetamido-2-(4-fluorobenzoyl)propionate.—Employing the procedure of Example 1, Step F but substituting for the dibenzyloxybromobenzene, an equivalent amount of 4-fluorobromobenzene, there is obtained benzyl L-2-acetamido-2-(4-fluorobenzoyl)propionate.

Step B: Preparation of L-2-methyl-3-(4-fluorophenyl)alanine.—Employing the procedure of Example 5, Steps B and C, but substituting for the ethyl L-2-acetamido-2-(3,4-dibenzyloxybenzoyl)propionate, an equivalent amount of benzyl L-2-acetamido-2-(4-fluorobenzoyl)propionate, there is obtained L-2-methyl-3-(4-fluorophenyl)alanine.

EXAMPLE 11

L-2-methyl-3-(3-chlorophenyl)alanine

Step A: Preparation of L-α-carboxy-N-benzoylalanine, ethyl ester.—Employing the procedure of Example 1, steps C and D, but substituting for α-benzyloxy-N-acetylalanine, benzyl ester used in Step C an equivalent amount of α-ethoxycarbonyl-N-benzoylalanine, ethyl ester there is produced α-carboxy-N-benzoylalanine, ethyl ester which is resolved as described in Step D to produce the L-isomer.

Step B: Preparation of L-4-ethoxycarbonyl-2-phenyl-4-methyloxazol-5-one.—Employing the procedure of Example 1, Step E, but substituting for the α-carboxy-N-acetylalanine, benzyl ester an equivalent amount of L-α-carboxy-N-benzoylalanine, ethyl ester, there is produced L-4-ethoxycarbonyl-2-phenyl-4-methyloxazol-5-one.

Step C: Preparation of ethyl L-2-benzoylamino-2-(3-chlorobenzoyl)propionate.—Employing the procedure of Example 1, Step F, but substituting for 3,4-dibenzyloxybromobenzene, an equivalent amount of 3-chlorobromobenzene in preparation of the Grignard and thereafter reacting it with L-4-ethoxycarbonyl-2-phenyl-4-methyloxazol-5-one in place of the 4-benzyloxycarbonyl-2,4-dimethyloxazol-5-one used in Example 1, Step F, there is produced ethyl L-2-benzoylamino-2-(3-chlorophenyl)propionate.

Step D: Preparation of L-N-benzoyl-2-methyl-3-(3-chlorophenyl)alanine, ethyl ester.—Employing the procedure of Example 5, Step B, but substituting for the ethyl L-2-acetamido-2-(3,4 - dibenzyloxybenzoyl)propionate an equivalent amount of ethyl-2-benzoylamino-2-(3-chlorophenyl)propionate there is produced L-N-benzoyl-2-methyl-3-(3-chlorophenyl)alanine, ethyl ester.

Step E: Preparation L-2-methyl-3-(3-chlorophenyl)alanine.—Employing the procedure of Example 5, Step C, but substituting for the L-N-acetyl-2-methyl-3-(3,4-dihydroxyphenyl)alanine, ethyl ester utilized therein an equivalent amount of L-N-benzoyl-2-methyl-3-(3-chlorophenyl)alanine, ethyl ester, there is produced L-2-methyl-3-(3-chlorophenyl)alanine.

EXAMPLE 12

L-2-methyl-3(3,4-diethylphenyl)alanine

Employing the procedures of Example 10, Steps A and B but substituting for the 4-fluorobromobenzene used in Step A an equivalent amount of 3,4-diethylbromobenzene there is obtained benzyl L-2-acetamido-2-(3,4-diethylbenzoyl)propionate, and L-2-methyl-3-(3,4 - diethylphenyl)alanine respectively.

What is claimed is:

1. A process for the preparation of a compound of structural formula

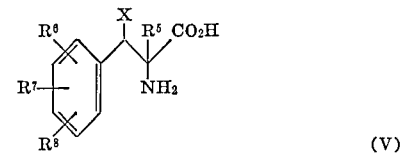

(V)

wherein $R^5$ is lower alkyl; $R^6$, $R^7$ and $R^8$ are similar or dissimilar and each is selected from the group consisting of hydrogen, hydroxy, lower alkyl, fluoro and chloro; and X is a member selected from the group consisting of hydrogen and hydroxy, which comprises in sequence the steps of:

(a) condensation of a compound of structural formula

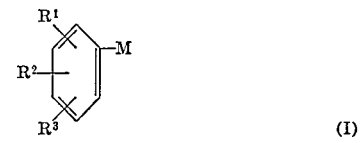

(I)

wherein $R^1$, $R^2$ and $R^3$ are similar or dissimilar and each is a member selected from the group consisting of hydrogen, lower alkyl, lower alkoxy, phenyl-lower alkoxy, fluoro and chloro; and M is a member selected from the group consisting of hydrogen, —Mg-(halide), —Li and

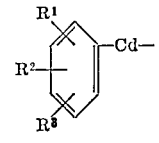

with a compound of structural formula

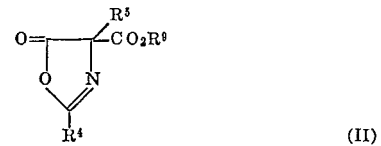

(II)

wherein $R^4$ is a member selected from the group consisting of lower alkyl and phenyl; $R^5$ is lower alkyl; and $R^9$ is a member selected from the group consisting of lower alkyl and phenyl-lower alkyl, in the presence of a Lewis acid when M is hydrogen or in an ether at $-80°$ C. to $+20°$ C. when M is other than hydrogen, to produce a keto ester of structural formula

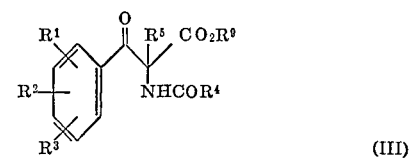

(III)

(b) treatment of the keto ester III with a reducing agent with simultaneous or subsequent elimination of the ester, amide and ether groups to produce a compound of structure V.

2. A modification of the process claimed in claim 1, wherein the keto-ester of structure III is treated with hydrogen in the presence of a platinum or palladium catalyst followed by treatment with a hydrohalic acid to produce the compound of structure V, wherein X is hydrogen, and $R^5$, $R^6$, $R^7$, and $R^8$ are as defined in claim 1.

3. A modification of the process claimed in claim 1 wherein the keto ester of structure III is treated with a reducing agent to yield a compound of structural formula

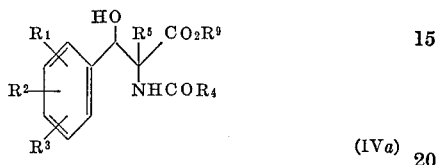

(IVa)

wherein $R^1$, $R^2$, $R^3$, $R^4$, $R^5$ and $R^9$ are as defined in claim 1 followed by treatment with hydrogen in the presence of a platinum or palladium catalyst followed by treatment with a hydrohalic acid to produce the compound of structure V, wherein X is hydrogen, and $R^5$, $R^6$, $R^7$ and $R_8$ are as defined in claim 1.

4. A modification of the process claimed in claim 3, wherein the serine ester of structure IVa is treated with hydriodic acid and red phosphorus to produce the compound of structure V, wherein X is hydrogen, and $R^5$, $R^6$, $R^7$ and $R^8$ are as defined in claim 3, with the proviso that $R^6$, $R^7$ and $R^8$ are other than p-hydroxy.

5. A process as claimed in claim 2, wherein the asymmetric carbon adjacent to the carboxyl group of compounds III and V are in the L-configuration.

6. A process as claimed in claim 3 wherein the asymmetric carbon adjacent to the carboxyl group of compounds IV and V are in the L-configuration.

7. A process as claimed in claim 4, wherein the asymmetric carbon adjacent to the carboxyl group of compounds IV and V are in the L-configuration.

8. A process for the preparation of 2-methyl-3-(3,4-dihydroxyphenyl)alanine comprising in sequence the steps of:

(a) reacting a compound of structural formula

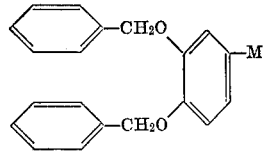

wherein:
M is a member selected from the group consisting of hydrogen, —Mg(halide), —Li and

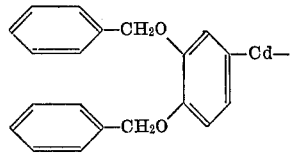

with a compound of structural formula

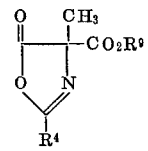

wherein $R^4$ is a member selected from the group consisting of lower alkyl and phenyl; and $R^9$ is a member selected from the group consisting of lower alkyl and phenyl-lower alkyl, in the presence of a Lewis acid when M is hydrogen or in an ether at —80° C. to +20° C. when M is other than hydrogen, to produce a compound of formula

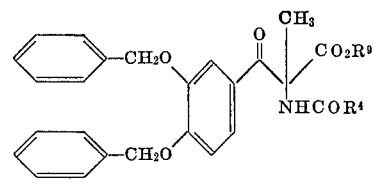

(b) treatment of the product of step (a) with hydrogen in the presence of a platinu mor palladium catalyst to produce a compound of formula

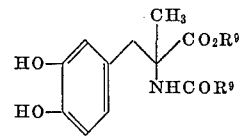

(c) followed by treatment with a hydrohalic acid.

9. A process as claimed in claim 8 wherein M is —MgBr.

10. A process as claimed in claim 8 wherein the asymmetric carbon adjacent to the carboxyl group is in the L-configuration.

References Cited

UNITED STATES PATENTS 3,440,278    4/1969    Kallischnigg et al. ____ 260—519

LORRAINE A. WEINBERGER, Primary Examiner

L. A. THAXTON, Assistant Examiner

U.S. Cl. X.R.

260—518, 307; 424—319